(12) United States Patent
Maier

(10) Patent No.: US 8,496,290 B2
(45) Date of Patent: Jul. 30, 2013

(54) MOTOR VEHICLE SEAT WITH PRELOADED WING-REST AND SEAT ARRANGEMENT WITH SUCH A MOTOR VEHICLE SEAT

(75) Inventor: Jürgen Maier, Weitersweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 537 days.

(21) Appl. No.: 12/419,564

(22) Filed: Apr. 7, 2009

(65) Prior Publication Data

US 2009/0250985 A1    Oct. 8, 2009

(30) Foreign Application Priority Data

Apr. 8, 2008   (DE) ................... 10 2008 017 707

(51) Int. Cl.
*A47C 13/00*  (2006.01)
*A47C 17/04*  (2006.01)

(52) U.S. Cl.
USPC .................... 297/112; 297/113; 297/116

(58) Field of Classification Search
USPC ............... 297/112, 113, 116, 117; 16/328, 16/330
See application file for complete search history.

(56) References Cited

U.S. PATENT DOCUMENTS

| | | | |
|---|---|---|---|
| 90,613 A | 5/1869 | Vogel | |
| 557,063 A | 3/1896 | Faneuf | |
| 1,500,524 A | 7/1924 | Phillips | |
| 1,886,595 A | 11/1932 | Sandquist | |
| 2,584,481 A | 2/1952 | Mast et al. | |
| 2,621,708 A * | 12/1952 | Luce, Jr. | 297/117 |
| 2,688,524 A | 9/1954 | Hodgman | |
| 2,720,658 A | 10/1955 | Lea | |
| 2,980,170 A | 4/1961 | Bechtold | |
| 3,094,354 A | 6/1963 | Bernier | |
| 3,328,077 A | 6/1967 | Krasinski | |
| 3,565,482 A | 2/1971 | Blodee | |
| 3,913,973 A | 10/1975 | Mintz et al. | |
| 3,926,473 A | 12/1975 | Hogan | |
| 4,519,646 A | 5/1985 | Leitermann et al. | |
| 4,796,955 A | 1/1989 | Williams | |

(Continued)

FOREIGN PATENT DOCUMENTS

| | | |
|---|---|---|
| CH | 265453 A | 12/1949 |
| DE | 916754 C | 8/1954 |

(Continued)

OTHER PUBLICATIONS

USPTO, US Office Action issued in U.S. Appl. No. 12/419,571, dated Apr. 1, 2011.

(Continued)

*Primary Examiner* — Anthony D Barfield
(74) *Attorney, Agent, or Firm* — Ingrassia Fisher & Lorenz, P.C.

(57) ABSTRACT

A motor vehicle seat is provided with a seat back which can be tilted from a substantially upright use position into a substantially horizontal non-use position. The seat back has at least one wing-rest which, in the non-use position of the seat back, can be tilted about a tilting axis extending in seat direction from a lower armrest non-use position into an upper armrest use position for forming an armrest. The wing-rest is preloaded into the armrest use position. A seat arrangement is also provided with such a motor vehicle seat.

20 Claims, 3 Drawing Sheets

U.S. PATENT DOCUMENTS

| | | | |
|---|---|---|---|
| 5,052,068 A | 10/1991 | Graebe | |
| 5,161,854 A | 11/1992 | Yokoto et al. | |
| 5,193,765 A | 3/1993 | Simpson et al. | |
| 5,344,213 A | 9/1994 | Koyanagi | |
| 5,384,946 A * | 1/1995 | Sundstedt et al. | 297/117 X |
| 5,409,297 A | 4/1995 | De Filippo | |
| 5,558,398 A | 9/1996 | Santos | |
| 5,722,703 A | 3/1998 | Iwamoto et al. | |
| 5,771,539 A * | 6/1998 | Wahlstedt et al. | 16/285 |
| 5,788,324 A | 8/1998 | Shea et al. | |
| 5,896,604 A | 4/1999 | McLean | |
| 5,947,554 A | 9/1999 | Mashkevich | |
| 5,951,084 A | 9/1999 | Okazaki et al. | |
| 5,979,985 A | 11/1999 | Bauer et al. | |
| 6,000,742 A | 12/1999 | Schaefer et al. | |
| 6,003,927 A | 12/1999 | Korber et al. | |
| 6,033,015 A * | 3/2000 | Husted | 297/188.19 X |
| 6,039,141 A | 3/2000 | Denny | |
| 6,132,128 A | 10/2000 | Burrows | |
| 6,176,547 B1 | 1/2001 | Francois et al. | |
| 6,189,458 B1 * | 2/2001 | Rivera | 108/44 X |
| 6,286,793 B1 | 9/2001 | Hirose et al. | |
| 6,513,876 B1 | 2/2003 | Agler et al. | |
| 6,547,323 B1 | 4/2003 | Aitken et al. | |
| 6,578,915 B2 | 6/2003 | Jonas et al. | |
| 6,793,282 B2 | 9/2004 | Plant et al. | |
| 6,840,577 B2 | 1/2005 | Watkins | |
| 6,896,331 B2 | 5/2005 | Kassai et al. | |
| 6,918,159 B2 * | 7/2005 | Choi | 16/347 |
| 7,104,609 B2 | 9/2006 | Kim | |
| 7,380,859 B2 | 6/2008 | Gardiner | |
| 7,419,216 B2 | 9/2008 | Hunziker | |
| 7,543,891 B2 | 6/2009 | Chung | |
| 7,677,656 B2 | 3/2010 | Saberan et al. | |
| 7,850,244 B2 | 12/2010 | Salewski | |
| 7,967,386 B2 | 6/2011 | Na | |
| 2002/0089220 A1 | 7/2002 | Achleitner et al. | |
| 2002/0109388 A1 | 8/2002 | Magnuson | |
| 2004/0036339 A1 | 2/2004 | Christoffel et al. | |
| 2004/0084948 A1 | 5/2004 | Glynn et al. | |
| 2006/0001304 A1 | 1/2006 | Walker et al. | |
| 2006/0076795 A1 | 4/2006 | Slade | |
| 2007/0052264 A1 | 3/2007 | Lee | |
| 2008/0036258 A1 | 2/2008 | Holdampf et al. | |
| 2009/0230712 A1 | 9/2009 | Maier et al. | |
| 2009/0236885 A1 | 9/2009 | Maier et al. | |
| 2009/0250983 A1 | 10/2009 | Maier et al. | |
| 2009/0250984 A1 | 10/2009 | Maier | |
| 2009/0250987 A1 | 10/2009 | Maier | |
| 2009/0267398 A1 | 10/2009 | Na | |
| 2010/0244478 A1 | 9/2010 | DePUE | |
| 2011/0133536 A1 | 6/2011 | Junige et al. | |
| 2011/0156452 A1 | 6/2011 | Schumm et al. | |

FOREIGN PATENT DOCUMENTS

| | | |
|---|---|---|
| DE | 1938500 U | 5/1966 |
| DE | 2509642 A1 | 9/1970 |
| DE | 2507848 A1 | 9/1979 |
| DE | 2935946 A1 | 3/1981 |
| DE | 8107888 U1 | 3/1981 |
| DE | 3147656 A1 | 6/1983 |
| DE | 3300993 A1 | 7/1984 |
| DE | 3619944 A1 | 12/1987 |
| DE | 4343242 A1 | 6/1995 |
| DE | 29517861 U1 | 1/1996 |
| DE | 29518897 U1 | 1/1996 |
| DE | 4441011 C1 | 3/1996 |
| DE | 19646470 A1 | 5/1998 |
| DE | 19746736 A1 | 4/1999 |
| DE | 19812137 A1 | 9/1999 |
| DE | 29915349 U1 | 1/2000 |
| DE | 20000479 U1 | 6/2001 |
| DE | 10012831 A1 | 9/2001 |
| DE | 20110317 U1 | 9/2001 |
| DE | 10052838 A1 | 5/2002 |
| DE | 10312041 A1 | 9/2004 |
| DE | 20320522 U1 | 10/2004 |
| DE | 10357630 A1 | 7/2005 |
| DE | 102004062942 A1 | 2/2006 |
| DE | 102004055569 A1 | 5/2006 |
| DE | 102005037785 A1 | 2/2007 |
| DE | 102005055138 A1 | 5/2007 |
| DE | 102006015180 A1 | 10/2007 |
| DE | 102006028453 A1 | 12/2007 |
| DE | 102008004232 B3 | 4/2009 |
| DE | 102008036227 A1 | 2/2010 |
| EP | 0104040 A2 | 3/1984 |
| EP | 0296939 A1 | 12/1988 |
| EP | 0566213 A2 | 10/1993 |
| EP | 0607758 A1 | 7/1994 |
| EP | 0943482 A2 | 9/1999 |
| EP | 0943483 A2 | 9/1999 |
| EP | 1728677 A1 | 12/2006 |
| EP | 1731351 A1 | 12/2006 |
| EP | 1772131 A1 | 4/2007 |
| FR | 1401166 A | 6/1965 |
| FR | 2816555 A1 | 5/2002 |
| JP | 59137832 U | 9/1984 |
| JP | 2004065762 A | 3/2004 |
| WO | 2004106108 A1 | 12/2004 |
| WO | 2006084393 A2 | 8/2006 |

OTHER PUBLICATIONS

USPTO, US Office Action issued in U.S. Appl. No. 12/420,528 dated Apr. 1, 2011.
USPTO, US Office Action issued in U.S. Appl. No. 12/419,848, dated Apr. 8, 2011.
Response to U.S. Office Action for U.S. Appl. No. 12/419,571, dated Jun. 28, 2011.
Response to U.S. Office Action for U.S. Appl. No. 12/420,528, dated Jul. 1, 2011.
Response to U.S. Office Action for U.S. Appl. No. 12/419,848, dated Jul. 6, 2011.
German Patent Office, German Search Report for Application No. 102008017708.3, dated Dec. 9, 2008.
German Patent Office, German Search Report for Application No. 102008017707.5, dated Apr. 22, 2009.
German Patent Office, German Search Report for Application No. 102008017712.1, dated Apr. 22, 2008.
German Patent Office, German Search Report for Application No. 102008017709.1, dated Apr. 22, 2009
UK IPO, British Search Report for Application No. 0905934.6, dated May 13, 2009.
UK IPO, British Search Report for Application No. 0905929.6, dated Jul. 10, 2009.
UK IPO, British Search Report for Application No. 0905935.3, dated Jul. 30, 2009.
UK IPO, British Search Report for Application No. 0905928.8, dated Jul. 30, 2009.
USPOTO Notice of Allowance issued in U.S. Appl. No. 12/419,528, mailed Sep. 26, 2011.
UK IPO, British Examination Report for Application No. 0905928.8, dated Feb. 1, 2012.
UK IPO, British Examination Report for Application No. 0905929.6, dated Feb. 7, 2012.
UK IPO, British Examination Report for Application No. 0905934.6, dated Feb. 17, 2012.
UK IPO, British Examination Report for Application No. 0905935.3, dated Mar. 7, 2012.
USPTO, Notice of Allowance issued in Application No. 12/419,571, mailed Mar. 20, 2012.
USPTO, Notice of Allowance issued in Application No. 12/420,528, mailed Mar. 20, 2012.
Response to US Office Action for U.S. Appl. No. 12/419,848, dated Mar. 20, 2012.
USPTO, Notice of Allowance issued in U.S. Appl. No. 12/420,528, mailed Oct. 17, 2011.
USPTO, Final Office Action issued in U.S. Appl. No. 12/419,848 mailed Oct. 20, 2011.
British Patent Office, British Examination Report for Application No. 0905928.8, dated Nov. 18, 2011.

USPTO, Notice of Allowance issued in U.S. Appl. No. 12/419,571, mailed Nov. 4, 2011. .
Chinese Patent Office, Chinese Office Action for Application No. 200910133083.0, date Mar. 31, 2012.
USPTO, Notice of Allowance issued in U.S. Appl. No. 12/419,571, dated Apr. 16, 2012.
USPTO, Notice of Allowance issued in U.S. Appl. No. 12/420,528, dated Apr. 16, 2012.
USPTO, Office Action issued in U.S. Appl. No. 12/419,848, dated Apr. 27, 2012.

* cited by examiner

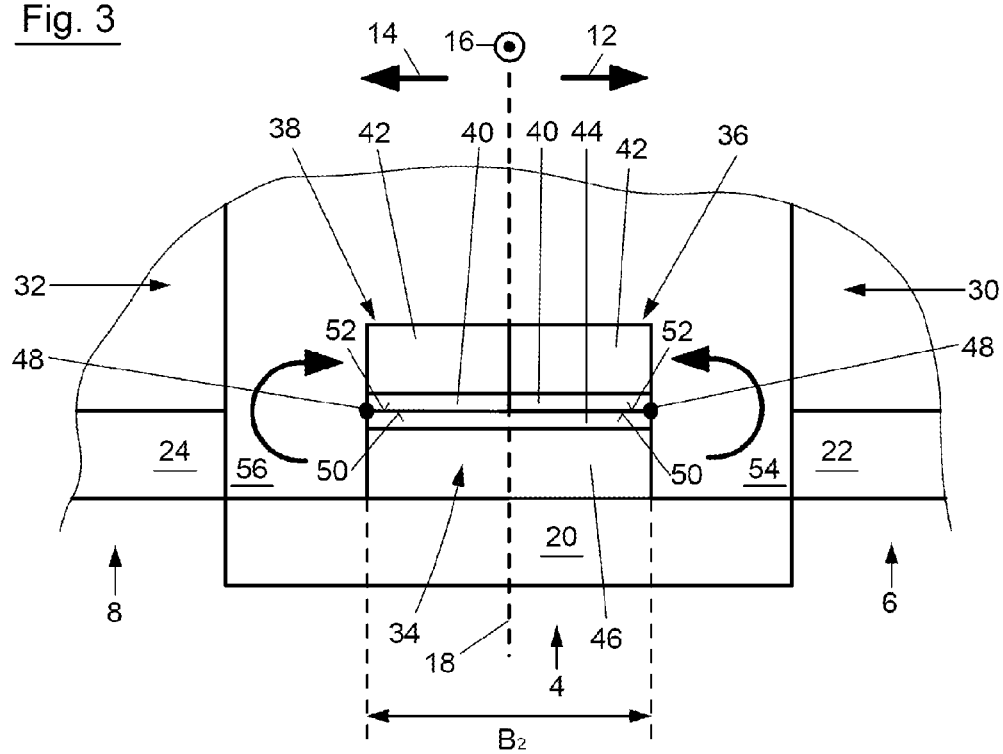
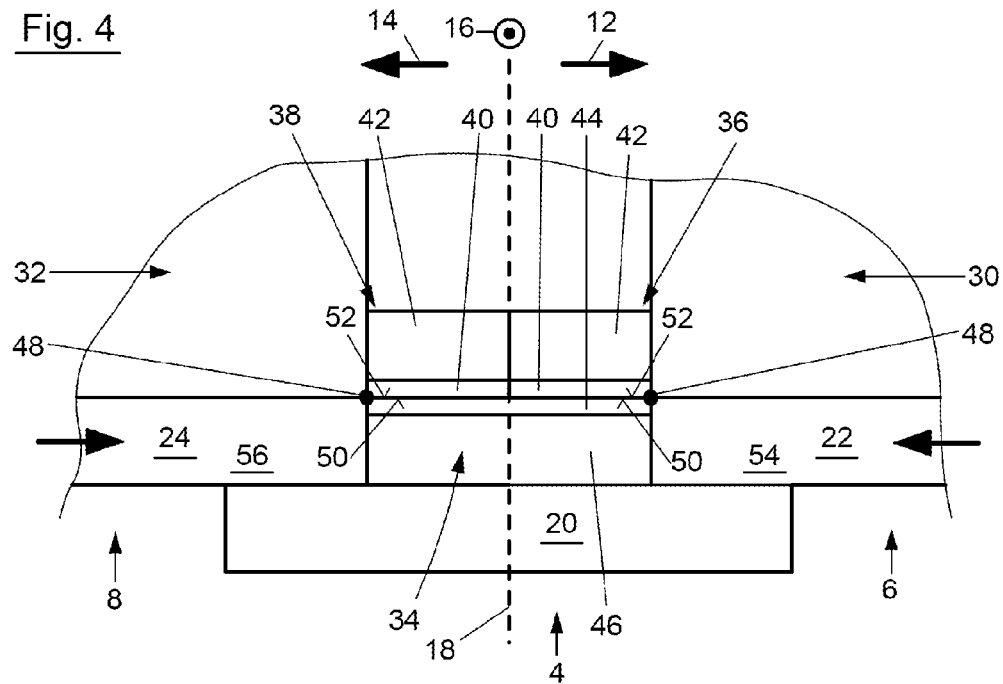

MOTOR VEHICLE SEAT WITH PRELOADED WING-REST AND SEAT ARRANGEMENT WITH SUCH A MOTOR VEHICLE SEAT

CROSS-REFERENCE TO RELATED APPLICATION

This application claims priority to German Patent Application No. 102008017707.5, filed Apr. 8, 2008, which is incorporated herein by reference in its entirety.

TECHNICAL FIELD

The present invention relates to a motor vehicle seat with a seat back which can be tilted from a substantially upright use position into a substantially horizontal non-use position, and the seat back has at least one wing-rest which, in the non-use position of the seat back, can be tilted about a tilting axis extending in seat direction from a lower armrest non-use position into an upper armrest use position for forming an armrest. The present invention relates further to a seat arrangement with such a motor vehicle seat.

BACKGROUND

From the prior art, motor vehicles with a seat back are known, and the seat back can be tilted forwards from a use position into a non-use position. The seat back or parts of it, respectively, which are tilted into the non-use position, can subsequently be used as armrest for an adjacent motor vehicle seat.

EP 0 943 482 B1 describes a motor vehicle seat within a seat arrangement which has a seat back which can be folded forwards. The seat back, in turn, has wing-rests laterally arranged on a middle seat back member. The wing-rests can be tilted about a tilting axis extending in seat direction from a lower armrest non-use position into an upper armrest use position when the seat back is in the non-use position. In the upper armrest use position, the wing-rests serve as armrest for the adjacent motor vehicle seats within the same seat row.

The known motor vehicle seat is established; however, it is of disadvantage in this respect that the handling of the wing-rests when displacing them from the armrest non-use position into the armrest use position is made difficult.

It is hence at least one object of the present invention to provide a motor vehicle seat of the generic type which ensures a particularly simple handling of the wing-rests when displacing them from the lower armrest non-use position into the upper armrest use position. The present invention is further based on an object to provide a seat arrangement with the above mentioned advantages. In addition, other objects, desirable features, and characteristics will become apparent from the subsequent summary and detailed description, and the appended claims, taken in conjunction with the accompanying drawings and this background.

SUMMARY

The motor vehicle seat according to an embodiment of the invention has a seat back which can be tilted from a substantially upright use position into a substantially horizontal non-use position. The seat back has further at least one wing-rest which, in the non-use position of the of the seat back, can be tilted about a tilting axis extending in seat direction from a lower armrest non-use position into an upper armrest use position for forming an armrest for an adjacent motor vehicle seat. The wing-rest is preloaded into the armrest use position.

For the motor vehicle seat according to an embodiment of the invention, adjusting or tilting, respectively, of the wing-rest from the armrest non-use position into the armrest use position is proven to be particularly simple because the wing-rest is preloaded into the armrest use position so that the wing-rest moves automatically into the armrest use position when the interlock of the wing-rest in the armrest non-use position is released. Thus, the vehicle passenger or the user, respectively, only has to release the interlock so that the wing-rest reaches automatically the armrest use position due to the preload.

In a preferred embodiment of the motor vehicle seat according to an embodiment of the invention, thus the wing-rest can be locked in the armrest non-use position against the preload to prevent an unintended tilting of the wing-rest into the armrest use position. As already explained above, the user only has to release the interlock so that the wing-rest tilts automatically into the armrest use position, if necessary.

In a further preferred embodiment of the vehicle seat according to the invention, the seat back has a middle seat back member at which the wing-rest is arranged, and a hinge mechanism is provided between the middle seat back member and the wing-rest so that the wing-rest can be tilted about the tilting axis from the armrest non-use position into the armrest use position and vice versa.

According to a further embodiment of the motor vehicle seat according to the invention, the hinge mechanism is formed by a strap hinge. Such a strap hinge needs particularly little space so that in this manner, a particularly compact motor vehicle seat can be provided which, in addition, is particularly easy to produce.

In a particularly preferred embodiment of the motor vehicle seat according to the invention, the hinge mechanism has a rod forming the tilting axis, which the rod, on the one hand, is guided in at least one guide member on the wing-rest and, on the other hand, in at least a second guide member on the middle seat back member. Hereby also, a particularly space-saving hinge mechanism is provided which, in addition, allows a particularly simple handling of the same, as can be seen from the preferred embodiments described below.

To achieve a safe guidance of the rod within the guide members, in a preferred embodiment of the motor vehicle seat according to the invention, the guide members are formed substantially tubular. For this, the tubular formed guide members, for example, can be integrally formed with the wing-rest, or the middle seat back member, or a section of the mentioned components, respectively.

In a particularly advantageous embodiment of the motor vehicle seat according to the invention, the rod is rotationally fixed to the first or the second guide member. Further, the rod can be moved from a locking position, in which the rod is rotationally fixed to the second or the first guide member, thus to the other guide member, in direction of the tilting axis into a release position in which the second or the first guide member, thus again the other guide member, can be tilted relative to the rod and the wing-rest can hence be tilted about the tilting axis. Thus, the rod, for example, can be permanently rotationally fixed to the first guide member on the wing-rest, while by means of the second guide member on the middle seat back member, a rotationally fixed connection exists in the locking position, and in the release position, a rotationally fixed connection does not exist any more. In this manner, the wing-rest can not be tilted about the tilting axis as long as the rod is in the locking position. Only when the rod is moved in longitudinal direction into the release position, the wing-rest can be tilted about the tilting axis from the armrest non-use position into the armrest use position, and the latter takes place automatically or self-actuated, respectively, due to the preload of the wing-rest.

To allow a simple operation or handling, respectively, of the rod, in a further advantageous embodiment of the motor vehicle seat according to the invention, the rod has an actuation end for its manual longitudinal displacement.

To ensure a particularly good accessibility of the actuation end of the rod, in a further preferred embodiment of the motor vehicle seat according to the invention, the actuation end is provided at the upper end of the seat back. Thus, the actuation end can project, for example, in the area of a head rest of the motor vehicle seat from the upper end of the seat back.

To implement the interlock of the wing-rest in the armrest non-use position in a particularly simple manner, in a further particularly preferred embodiment of the motor vehicle seat according to the invention, the rod has a radially projecting nose which is fixed in the locking position of the rod in a recess of the second or the first guide member and is retracted from the recess in the release position of the rod. Thus, for example, the recess could be a notch on the end side of the guide member, and the notch extends in direction of the tilting axis.

To ensure a secure interlocking of the wing-rest in the armrest non-use position, in a further preferred embodiment of the motor vehicle seat according to the invention, the rod is preloaded into the locking position, and this is preferably carried out by means of a compression spring such as, for example, a coil spring. Owing to the preload, it is further ensured, that the rod, when the wing-rest tilts back from the armrest use position into the armrest non-use position, is automatically pushed back again into the locking position. Accordingly, the interlocking of the wing-rest in the armrest non-use position also takes place self-actuated or automatically, respectively, when the user or the vehicle passenger, respectively, manually tilts the wing-rest from the armrest use position back into the armrest non-use position. Thereby, the handling of the motor vehicle seat is considerably simplified.

To achieve a particularly simple construction of the motor vehicle seat, in a further advantageous embodiment of the motor vehicle seat according to the invention, the wing-rest is preloaded by means of at least one leg spring into the armrest use position.

To further simplify the construction of the motor vehicle seat, the leg spring and/or the compression spring are wound around the rod. Hereby, a particularly compact construction of the motor vehicle seat is achieved.

In a further advantageous embodiment of the motor vehicle seat according to the invention, the wing-rest can be tilted by about 180° from the armrest non-use position into the armrest use position. Thus, for example, after tilting by about 180°, the wing-rest can abut in the armrest use position with its rear side against the rear side of the middle seat back member.

According to a further advantageous embodiment of the motor vehicle seat according to the invention, the width of the seat back in the armrest use position of the wing-rest is reduced compared to the armrest non-use position of the wing-rest. In this manner, a lateral free space is provided into which possibly adjacent motor vehicle seats can be moved to reduce the overall width of a seat row or to get the motor vehicle seats into a so-called lounge position, respectively.

For the purpose that the motor vehicle seat can be used for the formation of wing-rests for two adjacent motor vehicle seats, in a further advantageous embodiment, the motor vehicle seat according to the invention has two wing-rests of the mentioned type, each of them arranged in a transverse direction at the middle seat back member.

The seat arrangement according to the invention has a motor vehicle seat according to the invention of the aforementioned type and at least a second motor vehicle seat which are arranged adjacent within a seat row, wherein one wing-rest is arranged on the first motor vehicle seat's side facing the second motor vehicle seat. Hence, the wing-rest can be used for the formation of an armrest for the second motor vehicle seat. Further, after tilting the wing-rest into the armrest use position, the second motor vehicle seat can be moved further inwards to reduce the overall width of the seat row.

In a preferred embodiment of the seat arrangement according to the invention, further, a third motor vehicle seat is provided within the seat row, wherein the first motor vehicle seat is arranged between the second and the third motor vehicle seat. Thus, the one wing-rest can be used for the formation of an armrest for the second motor vehicle seat and the other wing-rest can be used for the formation of an armrest for the third motor vehicle seat.

To provide a particularly flexibly adjustable seat arrangement, in a particularly preferred embodiment of the seat arrangement according to the invention, the second and/or the third motor vehicle seat are moveable inwards in transverse direction in such a manner that they are extending at least partially into the free space which is obtained by tilting the wing-rest from the armrest non-use position into the armrest use position. As already mentioned above, hereby, the overall width of the seat row can be reduced so that the seats can be moved backwards into a so-called lounge position even when the width of the motor vehicle interior is reduced towards the back.

In a particularly preferred embodiment of the seat arrangement according to the invention, the first, the second, and the third motor vehicle seat can be moved independently from each other in seat direction.

BRIEF DESCRIPTION OF THE DRAWINGS

The present invention will hereinafter be described in conjunction with the following drawing figures, wherein like numerals denote like elements, and:

FIG. 3 shows the seat arrangement of FIG. 2 with the wing-rests in the armrest use position;

FIG. 4 shows the seat arrangement of FIG. 3 with the second and the third motor vehicle seat moved inwards in transverse direction.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
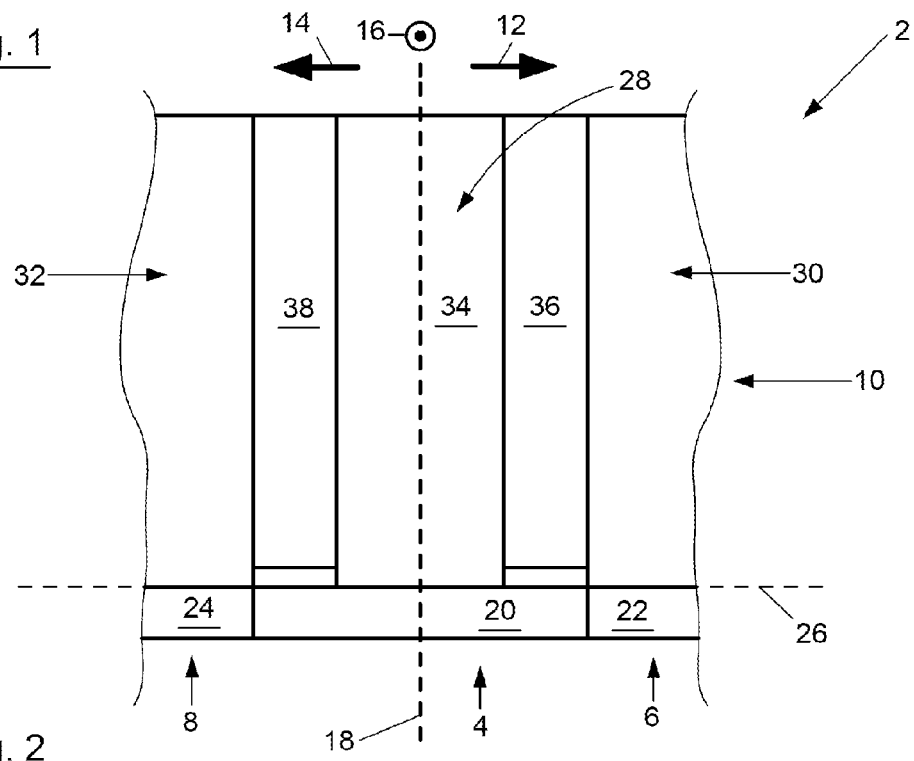
FIG. 1 shows a schematic front view of the seat arrangement according to an embodiment of the invention with the motor vehicle seat according to an embodiment of the invention with the seat back in the use position.

FIG. 1 shows a front view of the seat arrangement 2 according to an embodiment of the invention. The seat arrangement 2 comprises a middle, first motor vehicle seat 4, a second motor vehicle seat 6, and a third motor vehicle seat 8, which are arranged next to one another in a seat row 10. Here, the second motor vehicle seat 6 is arranged in the first transverse direction 12 next to the first motor vehicle seat 4, while the third motor vehicle seat 8 is arranged in the opposite second transverse direction 14 next to the first motor vehicle seat 4. The seat direction 16 is identical for all motor vehicle seats 4, 6, 8 and corresponds to the normal of the drawing in FIG. 1. In addition, the height direction 18 of the seat arrangement 2 or the motor vehicle seats 4, 6, 8, respectively, is indicated by means of a dashed height axis in FIG. 1. All three motor vehicle seats 4, 6, 8 can be moved independently from one another in seat direction 16 or opposite to the seat direction 16.

The first motor vehicle seat 4 represents an embodiment of the motor vehicle seat according to the invention, while the motor vehicle seats 6, 8 can be conventional motor vehicle seats. However, alternatively, the second and the third motor vehicle seat 6, 8 can also be formed in the manner of the first motor vehicle seat 4. All motor vehicle seats 4, 6, 8 comprise one seat member 20, 22, 24, respectively, as well as a seat back 28, 30, 32, which is arranged tiltable about a first tilting axis 26 at the respective seat member 20, 22, 24. The seat backs 28, 30, 32 can be tilted independently from one another about the first tilting axis 26.

The seat back 28 of the first motor vehicle seat 4 has a substantially of a middle seat back member 34 and two wing-rests 36, 38, laterally attached thereto. While the wing-rest 36 is arranged laterally in transverse direction 12 at the middle seat back member 34 and hence faces the second motor vehicle seat 6, the wing-rest 38 is arranged laterally in transverse direction 14 at the middle seat back member 34 and hence faces the third motor vehicle seat 8.

Figure 2:
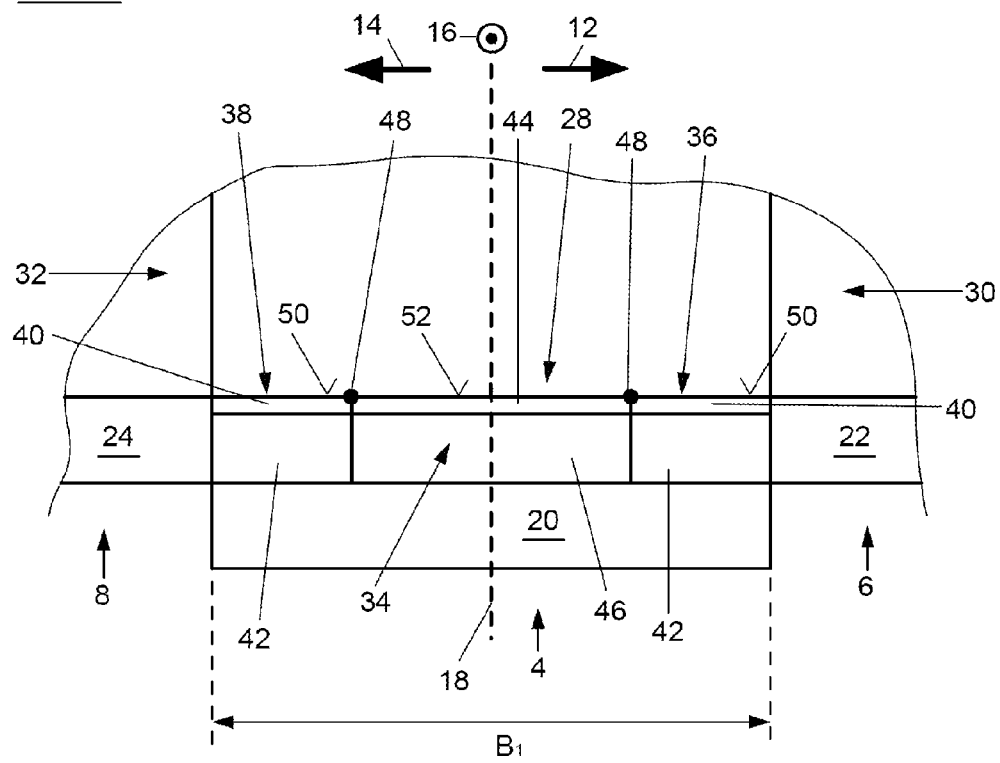
FIG. 2 shows the seat arrangement of FIG. 1 with the seat back in the non-use position.

The seat back 28 of the first motor vehicle seat 4 can be tilted forward in seat direction 16 about the first tilting axis 26 from a substantially upright use position, shown in FIG. 1, into a substantially horizontal non-use position, shown in FIG. 2. As shown in FIG. 2, the seat member 20 of the first motor vehicle seat 4 lowers during the tilting movement of the seat back 28 about the first tilting axis 26 in height direction 18 downwards in such a manner that the upper side of the seat member 20 is arranged below or at the same height of the lower side of the seat members 22, 24 of the second and the third motor vehicle seat 6, 8, and this function will be addressed again later in more detail.

It is further shown in FIG. 2 that each of the wing-rests 36, 38 has a plate-shaped support member 40 and an upholstery member 42. Accordingly, the middle seat back member 34 has a plate-shaped support member 44 as well and an upholstery member 46 arranged thereon. The support member 40 of the wing-rests 36, 38 is arranged at the plate-shaped support member 44 of the middle seat back member 34 and can be tilted about a second tilting axis. Here, the support members 40 each have a rear side 50 which, in the use position (FIG. 1) and the non-use position (FIG. 2) of the seat back 28, form together with a rear side 52 of the support member 44 of the middle seat back member 34, the rear side of the seat back 28.

In FIG. 2, the wing-rests 36, 38 are in a lower armrest non-use position in which the wing-rests 36, 38 are arranged on the sides of the middle seat back member 34. In the armrest non-use position, the rear sides 50, 52 of the wing-rests 36, 38 or the middle seat back member 34, respectively, are arranged in one plane. Further, the wing-rests 36, 38 are releasably locked in the armrest non-use position in such a manner that they can not be tilted about the second tilting axes 48. The interlocking mechanism for interlocking the wing-rests 36, 38 in the armrest non-use position will be addressed later in more detail.

Starting from the lower armrest non-use position (FIG. 2), the wing-rests 36, 38 can be tilted about the tilting axis 48 extending in seat direction 16 into an upper armrest use position, as shown in FIG. 3. For this, the wing-rests 36, 38 are tilted by about 180° from the armrest non-use position into the armrest use position shown in FIG. 3. In the upper armrest use position, the upholstery members 42 of the wing-rests 36, 38 each form an armrest for the second motor vehicle seat 6 or the third motor vehicle seat 8, respectively. After tilting by about 180°, the rear sides 50 of the support members 40 of the wing-rests 36, 38 are supported on the rear sides 52 of the support member 44 of the middle seat back member 34.

By means of the tilting movement, the initial width B1 of the seat back 28, which is indicated in FIG. 2, is reduced to a width B2 which is shown in FIG. 3. Thus, B2<B1 applies. As already mentioned, by means of the tilting movement of the seat back 28 about the first tilting axis 26, the seat member 20 is shifted downwards in height direction 18 so that in transverse direction 12 or 14, respectively, a free space 54 or 56, respectively, is generated sideways of the middle seat back member 34. Since the two motor vehicle seats 6, 8 can be moved in the transverse directions 12 and 14, it is now possible to move the second motor vehicle seat 6 in transverse direction 14 and the third motor vehicle seat 8 in transverse direction 12 far enough inwards so that their seat members 22 or 24, respectively, extend into the respective free space 54 or 56, respectively. In this manner, the motor vehicle seats 6, 8 can be arranged closer to the associated armrests so that the overall width of the seat row 10 is reduced.

According to an embodiment of the invention, the wing-rests 36, 38 are preloaded into the upper armrest use position shown in FIG. 3 and FIG. 4. This has the advantage that the wing-rests tilt automatically or self-actuated, respectively, about the tilting axes 48 from the armrest non-use position, shown in FIG. 2, into the armrest use position, shown in FIG. 3 and FIG. 4, as soon as the interlocking of the wing-rests has been released by the user or the vehicle passenger, respectively.

Hereinafter, the structure of the seat back 28 is described in more detail with reference to FIG. 5 which shows a front view of the seat back 28, wherein the seat back 28 is shown without the upholstery members 42 and 46.

To allow a tilting of the wing-rests 36, 38 relative to the middle seat back member 34 about the tilting axes 48, between the middle seat back member 34 and each of the wing-rests 36, 38, one hinge mechanism 58, respectively, is provided. The hinge mechanism 58 has two first guide members 60 arranged at the support member 40 of the wing-rest 36 or 38, respectively, and two second guide members 62 which are mounted to the support member 44 of the middle seat back member 34. The guide members 60, 62 are formed substantially tubular and are arranged aligned in a row. Through the tubular guide members 60, 62, a rod 64 extends which is guided moveable in longitudinal direction within the guide members 60, 62. At the same time, the rod 64 extends along the second tilting axis 48. To be able to move the rod 64 manually in longitudinal direction or in direction of the second tilting axis 48, respectively, the rod has an actuation end 66. For the actuation end 66 to be easily accessible, it is provided at the upper end 68 of the seat back 28 or projects above this upper end 68.

Figure 5:
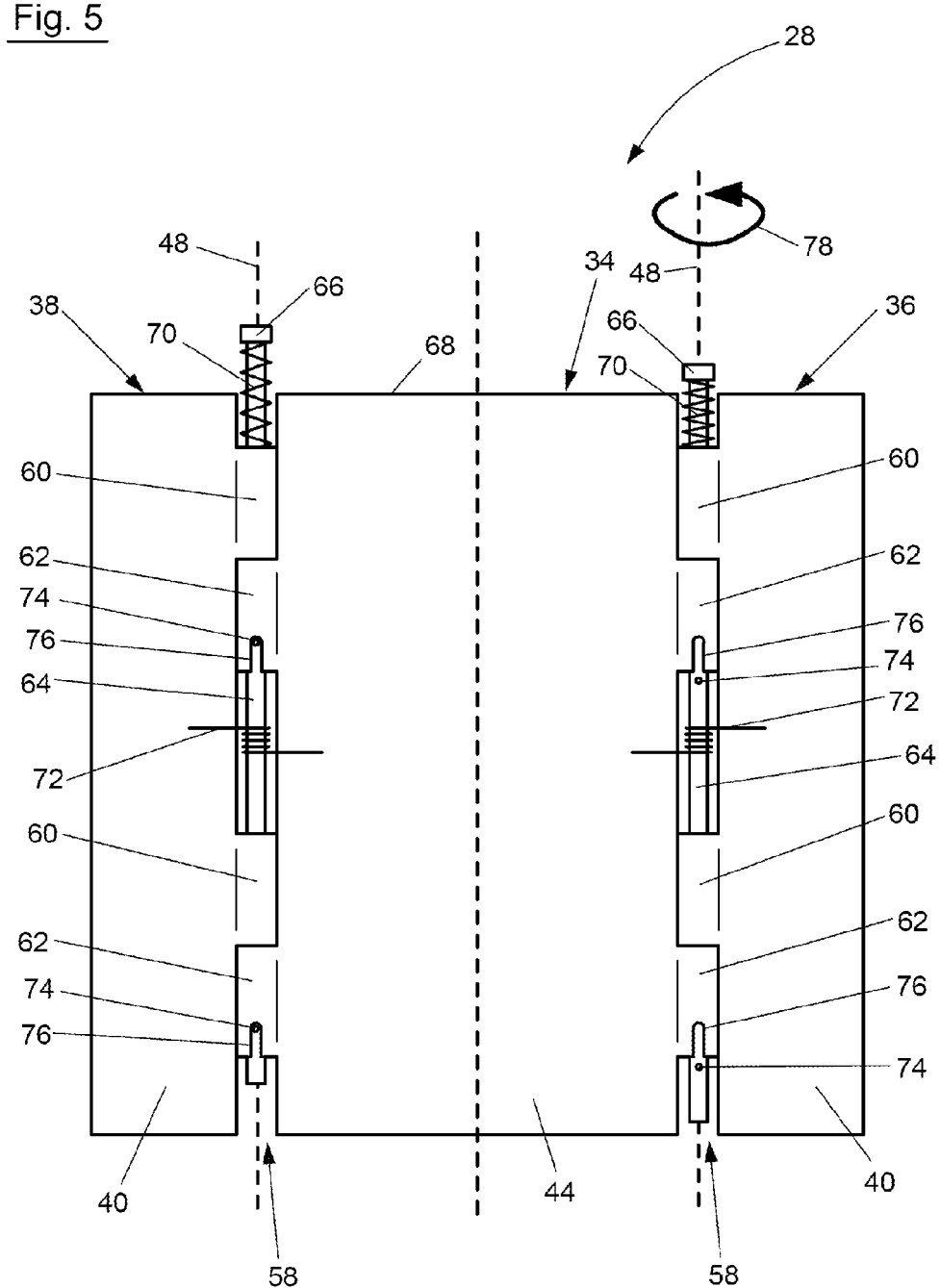
FIG. 5 shows a front view of the seat back of the motor vehicle seat of the FIG. 1 to FIG. 4 with the wing-rests in the armrest non-use position and without upholstery members.

The rod 64 can be moved in longitudinal direction from the locking position, indicated in FIG. 5 on the left side, into a release position which is indicated on the right side of FIG. 5. For this, the rod 64 is preloaded by means of a compression spring 70 into the locking position. The compression spring 70 is wound here around the rod 64. Furthermore, at least one leg spring 72 is provided for each hinge mechanism 58, and the leg spring is wound around the rod 64 as well and causes the preload of the wing-rests 36, 38 into the armrest use position.

Independent from the fact that the rod 64 is moveable in longitudinal direction within the first guide members 60 and the second guide members 62, the rod 64 is rotationally fixed to the first guide members 60, and a detailed description of the rotationally fixed connection in FIG. 5 is abandoned. Such a permanent rotationally fixed connection can be created, for example, by means of a parallel key. In the locking position of the rod 64, the rod 64 is further rotationally fixed to the second guide members 62. This is caused by a radially projecting nose 74 on the rod 64, which said nose is fixed in the locking position in a recess 76 of the second guide member 62. The recess 76 is formed here by a front-side notch in the wall of the tubular second guide member 62. Owing to the rotationally fixed connection of the rod 64 to the guide members 60, 62, the wing-rest 36, 38 is interlocked in the armrest non-use position against the preload of the leg springs 72.

If the user or the vehicle passenger, respectively, wants to tilt the wing-rest 36, 38 into the armrest use position, which is indicated in FIG. 3, then he/she must move the rod 64 against the preload of the compression spring 70 along the tilting axis 48 into the release position shown on the right side of FIG. 5. By means of the movement into the release position, the projecting nose 74 is retracted from the recess 76 so that now there is no rotationally fixed connection anymore between the rod 64 and the second guide member 62. Accordingly, the wing-rest 36 or 38, respectively, can now be tilted about the second tilting axis 48 into the armrest use position, as already illustrated earlier with reference to the FIG. 2 and FIG. 3. Here, the tilting movement indicated in FIG. 5 by means of the arrow 78 is caused automatically by means of the preload of the leg spring 72.

To bring the wing-rest 36, 38 from the armrest use position, shown in FIG. 3, back again into the armrest non-use position, shown in FIG. 2, the user only has to tilt back the wing-rest 36, 38 about the second tilting axis 48 against the spring force of the leg spring 72 until the projecting nose 74 locks in place again into the recess 76 due to the preload force of the compression spring 70. The interlocking in the armrest non-use position again takes place self-actuated or automatically, respectively, and the handling is further simplified.

In an alternative not-shown embodiment, the hinge mechanism 58 can also be formed by a strap hinge.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle seat arrangement, comprising:
   a first seat having a seat bottom and a seat back;
   a second seat having a seat bottom and a seat back; and
   a third seat arranged between the first seat and the second seat, the third seat comprising:
   a seat bottom,
   a seat back having a height substantially equal to a height of the seat back of the first seat and the seat back of the second seat, wherein the entire seat back of the third seat is adapted to tilt towards the seat bottom from a substantially upright use position into a substantially horizontal non-use position along a first axis, wherein the seat back is in the substantially horizontal non-use position, a rear portion of the seat back is configured to be tilted about a tilting axis extending in a seat direction from a lower armrest non-use position into an upper armrest use position for forming an armrest, wherein the tilting axis is substantially perpendicular to the first axis,
   the seat back further comprising:
   a releasable interlock locking the seat backseat back in the lower armrest non-use position,
   wherein when the releasable interlock is released the seat backseat back is automatically loaded into the upper armrest use position from the lower armrest non-use position.

2. The motor vehicle seat arrangement according to claim 1, wherein the seat back can be interlocked in the lower armrest non-use position against the automatic loading into the upper armrest use position.

3. The motor vehicle seat arrangement according to claim 1, wherein the releasable interlock further comprises a hinge mechanism between a middle seat back member and the armrest.

4. The motor vehicle seat arrangement according to claim 3, wherein the hinge mechanism is formed by a strap hinge.

5. The motor vehicle seat arrangement according to claim 3, wherein the hinge mechanism has a rod forming the tilting axis, said rod is guided in at least a first guide member at the arm rest and guided in a second guide member at the middle seat back member.

6. The motor vehicle seat arrangement according to claim 5, wherein the first guide member and the second guide member are substantially tubular.

7. The motor vehicle seat arrangement according to claim 5, wherein the rod is rotationally fixed to at least one of the first guide member or the second guide member and can be longitudinally moved in a direction of the tilting axis from a locking position, in which the rod is rotationally fixed to at least one of the second guide member or the first guide member, into a release position in which at least one of the second guide member or the first guide member can be tilted relative to the rod and hence the seat back can be tilted about the tilting axis.

8. The motor vehicle seat arrangement according to claim 7, wherein the rod has an actuation end for manually moving the same in a longitudinal direction.

9. The motor vehicle seat arrangement according to claim 8, wherein the actuation end is provided at an upper end of the seat back.

10. The motor vehicle seat arrangement according to claim 7, wherein the rod has a radially projecting nose which is fixed in the locking position of the rod in a recess at at least one of the second guide member or the first guide member and is retracted from the recess in the release position of the rod.

11. The motor vehicle seat arrangement according to claim 7, wherein the rod is preloaded into the locking position with a compression spring.

12. The motor vehicle seat arrangement according to claim 11, wherein the seat back is automatically loaded into the upper armrest use position with a leg spring.

13. The motor vehicle seat arrangement according to claim 12, wherein at least one of the leg spring or the compression spring is substantially wound around the rod.

14. The motor vehicle seat arrangement according to claim 3, wherein the motor vehicle seat has two wing-rests, each of the two wing-rests arranged in a transverse direction at the middle seat back member.

15. The motor vehicle seat arrangement according to claim 1, wherein the seat back can be tilted by about 180° from the lower armrest non-use position into the upper armrest use position.

16. The motor vehicle seat arrangement according to claim 1, wherein a width of the seat back is reduced in the upper armrest use position in comparison to the lower armrest non-use position.

17. A seat arrangement, comprising:
a first motor vehicle seat, said first motor vehicle seat comprising:
a seat back, wherein the entire seat back is adapted to tilt along a first axis from a substantially upright use position into a substantially horizontal non-use position, wherein the seat back, when in the substantially horizontal non-use position, is configured be tilted about a tilting axis extending in a seat direction from a lower armrest non-use position into an upper armrest use position for forming an armrest, wherein the tilting axis is substantially perpendicular to the first axis, the seat back further comprising:
a releasable interlock locking the seat back in the lower armrest non-use position,
wherein when the releasable interlock is released the seat back is automatically loaded into the upper armrest use position the lower armrest non-use position;
a second motor vehicle seat having a seat back arranged next to the first motor vehicle seat within a seat row,
wherein a height of the seat back of the first motor seat is substantially equal to a height of the seat back of the second motor vehicle seat.

18. The seat arrangement according to claim 17, further comprising a third motor vehicle seat in the seat row,
wherein the first motor vehicle seat is arranged between the second motor vehicle seat and the third motor vehicle seat.

19. The seat arrangement according to claim 18, wherein at least one of the second motor vehicle seat or the third motor vehicle seat is moveable inwards in a transverse direction in such a manner to extend at least partially into a free space that is obtained by tilting the seat back from the lower armrest non-use position into the upper armrest use position.

20. The seat arrangement according to claim 17, wherein the first motor vehicle seat, the second motor vehicle seat, and third motor vehicle seat can be moved independently from one another in the seat direction.

* * * * *